US012729064B1

(12) United States Patent
Sandhu et al.

(10) Patent No.: US 12,729,064 B1
(45) Date of Patent: Sep. 8, 2026

(54) ROBOTIC RE-STOWING OF RELOCATED INVENTORY

(71) Applicant: Amazon Technologies, Inc., Seattle, WA (US)

(72) Inventors: Yvetta Pols Sandhu, Winchester, MA (US); Julie Mitchell, Lynnfield, MA (US); Yashoda Dadkar, Andover, MA (US); Joseph Durham, Arlington, MA (US); Michael Andrew DeMalia, South Easton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 386 days.

(21) Appl. No.: 18/535,867

(22) Filed: Dec. 11, 2023

(51) Int. Cl.

| | |
|---|---|
| ***B65G 1/137*** | (2006.01) |
| ***B25J 9/16*** | (2006.01) |
| ***B65G 1/04*** | (2006.01) |
| ***G05B 19/418*** | (2006.01) |
| ***G06Q 10/08*** | (2024.01) |
| ***G06Q 10/087*** | (2023.01) |

(52) U.S. Cl.
CPC .......... *B65G 1/1378* (2013.01); *B25J 9/1679* (2013.01); *B65G 1/0492* (2013.01); *B65G 1/1375* (2013.01); *G05B 19/41895* (2013.01); *G06Q 10/08* (2013.01); *G06Q 10/087* (2013.01)

(58) Field of Classification Search
CPC .. B65G 1/1378; B65G 1/1375; B65G 1/0492; B25J 9/1679; G05B 19/41895; G06Q 10/08; G06Q 10/087
See application file for complete search history.

(56) References Cited

U.S. PATENT DOCUMENTS

| | | | | |
|---|---|---|---|---|
| 2023/0278800 | A1* | 9/2023 | Mohanarajah ....... | B65G 1/0492 414/331.01 |
| 2023/0406638 | A1* | 12/2023 | Yu ........................ | G06Q 10/087 |
| 2024/0124237 | A1* | 4/2024 | Cao ...................... | B65G 1/1378 |
| 2024/0391697 | A1* | 11/2024 | Sayilar ................. | B65G 1/1378 |
| 2025/0115431 | A1* | 4/2025 | Liu ...................... | B65G 1/0492 |
| 2026/0021970 | A1* | 1/2026 | Liu ...................... | B65G 1/1378 |

* cited by examiner

*Primary Examiner* — Thomas Randazzo
(74) *Attorney, Agent, or Firm* — K&L Gates LLP

(57) ABSTRACT

Systems and methods for robotic re-stowing of relocated inventory are described. In some examples, a determination may be made that a first tote located in a first zone of a processing facility includes a first item bound for a second zone of the processing facility. The first tote may be scanned by a first scanner of a first conveyance system to determine that the first tote is bound for the second zone. The first conveyance system may transport the first tote from the first zone to the second zone. The first tote may be robotically stowed on a first storage pod in the second zone. A first laden robotic drive unit may transport the first storage pod to a first pick station in the second zone.

20 Claims, 7 Drawing Sheets

700

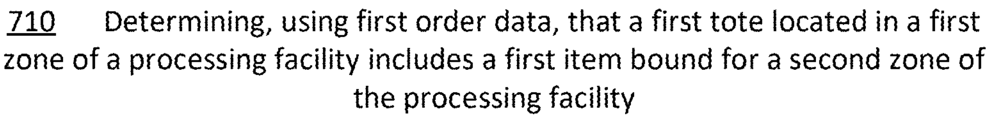

710 Determining, using first order data, that a first tote located in a first zone of a processing facility includes a first item bound for a second zone of the processing facility 720 Determining, using a first scanner of a first conveyance system, that the first tote is bound for the second zone 730 Transporting, by the first conveyance system, the first tote from the first zone to the second zone 740 Robotically stowing the first tote on a first storage pod in the second zone 750 Transporting, by a first laden robotic drive unit, the first storage pod to a first pick station in the second zone

FIG. 7

ROBOTIC RE-STOWING OF RELOCATED INVENTORY

BACKGROUND

In a heterogeneous robotic processing facility, robotic drive systems can be used to move items and/or containers of items from one location to another. Robotic arms can be used to sort items by removing an item from one location and placing the item in a different, target location. Systems of such robots can be designed and deployed to accomplish a variety of tasks such as item retrieval, processing, and sortation.

BRIEF DESCRIPTION OF DRAWINGS

FIG. 7 is a flow chart illustrating an example process for zone relocation and robotic re-stowing of inventory, in accordance with various aspects of the present disclosure.

DETAILED DESCRIPTION

Figure 1:
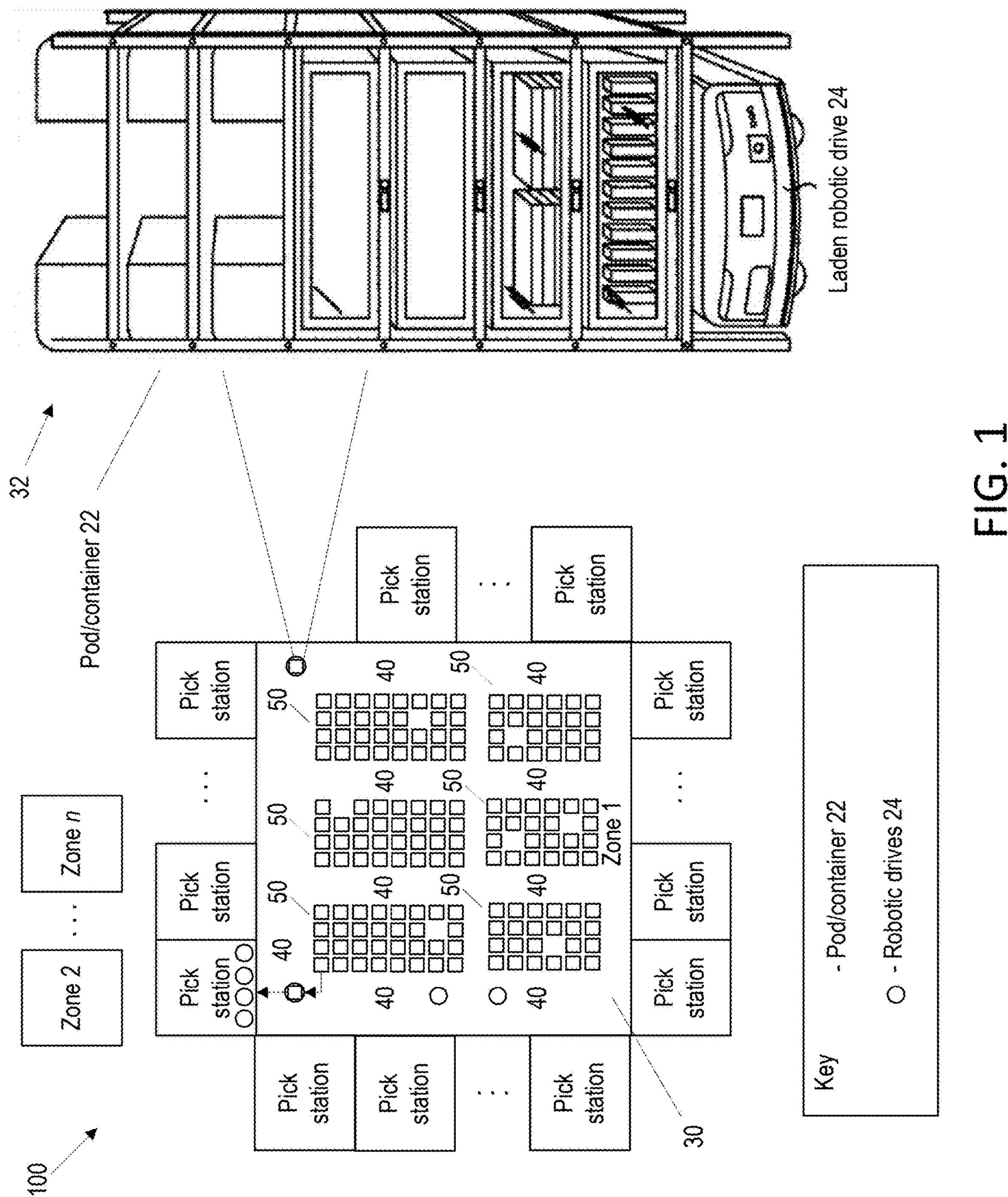
FIG. 1 is a diagram of an example scaled-down overhead view of a multi-zone robot-controlled storage field with pick stations, according to various aspects of the present disclosure.

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

In various examples, robotic picking and sortation systems may be used in large-scale inventory processing and storage environments in which a large number of items are received, processed, stored, sorted, and sent out. For example, large-scale delivery and inventory management systems may use fulfillment centers and other large warehouses that may serve as part of the supply chain and can serve as a hub for logistics and processes used to get items from third party sellers to the purchaser.

In some cases, received items at a robotic fulfillment center may be placed in robot-controlled storage fields. For example, items may be stored in containers (sometimes referred to as "pods" (e.g., shelved units carrying inventory)). When an item is ordered and needs to be processed for shipment, instead of having a human worker find and walk to a storage shelf in a warehouse to "pick" the item, robotic drives may be controlled to select the pod (or other container) storing the item and may transport the pod to a pick station where a worker or another robot may pick the item from the pod and send the item for downstream processing.

In current facilities, after picking an item, items may be singulated (e.g., from bins into which picked items are placed). The singulated items may be sorted and sent to a "re-bin station," where items that are to be combined within the same outbound package are placed into the same receptacle. Once the receptacle has all the items for the particular shipment, the items are removed and are packed together (e.g., in a package) for shipment. However, such facilities are often very large and have different zones. For example, zones may be located on different floors of a facility and/or in different areas of a building. Zones, as described herein, refer to different processing areas within a facility that each are able to complete the item processing task (e.g., item picking, processing, sortation, and/or shipment packing). Currently, if two items which are destined for the same delivery location are located in different zones after being picked the items may need to be taken to the same re-bin station in order to be placed into the same package for shipment. In a small facility this may be a trivial challenge. However, in large facilities, transporting an item to a different zone may be challenging and/or inefficient.

For example, some current facilities use large conveyor-based systems to send items that are to be packed together with other items (including "unentitled items" (items that are not located in the zone in which they will be processed)) to the "parent" zone (the zone in which the item will be processed and/or packed together with the other items). However, in large facilities, such conveyor-based systems, which may span nearly the entire footprint of the processing facility in order to inter-link all related zones, are complex, expensive systems that may be prone to malfunction and/or may require frequent maintenance. Currently, when items are placed onto such an inter-zone conveyor, the items, upon egress from the inter-zone conveyor at the parent zone, are singulated, sorted, and routed to a parent zone re-bin station for combination with other items in the same order. This requires multiple touches for the items (singulation and sortation) and may impact facility throughput and staffing requirements.

Described herein are various systems and techniques that may be used for inter-zone relocation and/or re-stowing of inventory. The various systems and techniques described herein may not require the large-scale conveyance systems with tracks that span each different zone of a processing facility. Instead, the systems and techniques may use vertical indexing conveyors (VICs) or other limited inter-zone conveyors to move totes of items to the relevant parent floor to complete an order. A tote, as referred to herein, refers to any type of container or bin that may container one or more items and/or packages of items. These unentitled items are picked to tote from the child zone (a zone in which the item is considered "unentitled") through relocation and re-stowing stations along the perimeter of a robotic storage field. The totes of re-located items may be moved vertically to the parent floor and the entire tote may be re-stowed at a robotic stow station (e.g., part of the relocation and re-stowing station) back into the robotic storage field using a robotically-transported tote transportation pod. Once the relocated inventory is available in the parent zone, the tote transportation pod may be controlled to take the tote to a re-bin station, where items may be combined for shipment.

In some examples described herein, totes may be removed from dense tote pods (e.g., pods that carry totes instead of individual items) using a robotic gantry, robotic arm, or other robotic manipulator and may be placed onto a vertical (or other) tote lift to transport the tote to a parent zone. Upon arrival at the parent zone, another robotic gantry (or other robotic manipulator) may remove the tote from the vertical tote lift and may place the tote into an available bay on another dense tote pod. A laden robotic drive unit may transport the dense tote pod to the relevant rebin station (e.g., a multi-item assembly station where multiple items may be designated for packing together) so that the tote may be removed and items may be combined for shipment as discussed above.

In various facilities, each floor of the facility may be a different zone. In such cases, a vertical conveyor system may be used to convey totes of unentitled items to the parent zone while occupying minimal footprint within the facility. However, it should be noted that different zones may also be on the same floor. Accordingly, while vertical conveyor systems are generally referred to herein, it should be noted that horizontal conveyor systems may be deployed, in addition to (or in conjunction with) vertical conveyor systems, in facilities in which different zones are located on the same floor.

It should be noted that robot-controlled storage fields and the various retrieval techniques may be used in other contexts beyond commercial delivery systems and in general may be used whenever items are to be stored and later retrieved from storage (e.g., warehouse inventory, equipment, archives, etc.). Accordingly, although many of the examples described herein use a package delivery example, the various dynamic allocation techniques used to control robotic resources may instead be deployed in other object-picking and/or sortation contexts.

FIG. 1 is a diagram of an example scaled-down overhead view 100 of a multi-zone robot-controlled storage field with pick stations, according to various aspects of the present disclosure. In the example, a storage field 30 is associated with a first zone of the facility. In some examples, the first zone represented by the storage field 30 and the surrounding pick stations may be located on a first floor of the facility, while zones 2 . . . n may be located on other floors. The storage field 30 comprises storage blocks 50, with each storage block 50 including a grid of pods/containers 22. Laden robotic drives 24 may move along corridors 40 (e.g., to retrieve pods/containers 22 from storage blocks 50, to take pods to pick stations, to return from pick stations to retrieve other pods/containers 22, etc.). Laden robotic drives 24 may be configured to navigate the storage field 30 to locate specified pods/containers and may move the pod/container to a specific pick station. As shown, the pick stations may be located along the perimeter of the storage field 30 (e.g., for safety) although, other implementations and/or floor plans may be used, as desired. As shown in image 32, the laden robotic drive 24, in some examples, may drive under the pod/container 22 and may lift the pod/container and navigate to the appropriate pick station. A human and/or another robot at the pick station may locate the relevant item or items from the pod/container 22 (e.g., according to an item order list) and may remove those items for further processing. In some other examples facilities, the pod/containers 22 may carry totes and the totes may be removed at the pick stations (an example is described below in FIG. 6). Although not shown in FIG. 1, laden robotic drives 24 may pass under pods without contacting the pods. Laden robotic drives 24 may employ a lifting mechanism (e.g., a hydraulic lift mechanism, a pneumatic lift mechanism, etc.) to lift a requested pod in order to carry the pod to a desired location (e.g., a particular pick station).

When an entitled item that is to be processed in the same zone is picked at a pick station, the entitled item can be taken to a nearby rebin station (not shown in FIG. 1) for combination with other items in the same order, as previously described. However, when the picked item is bound for a different zone, the item may be transported to its parent zone (the zone in which the item and/or tote is to be processed) using the various techniques described herein.

Figure 2:
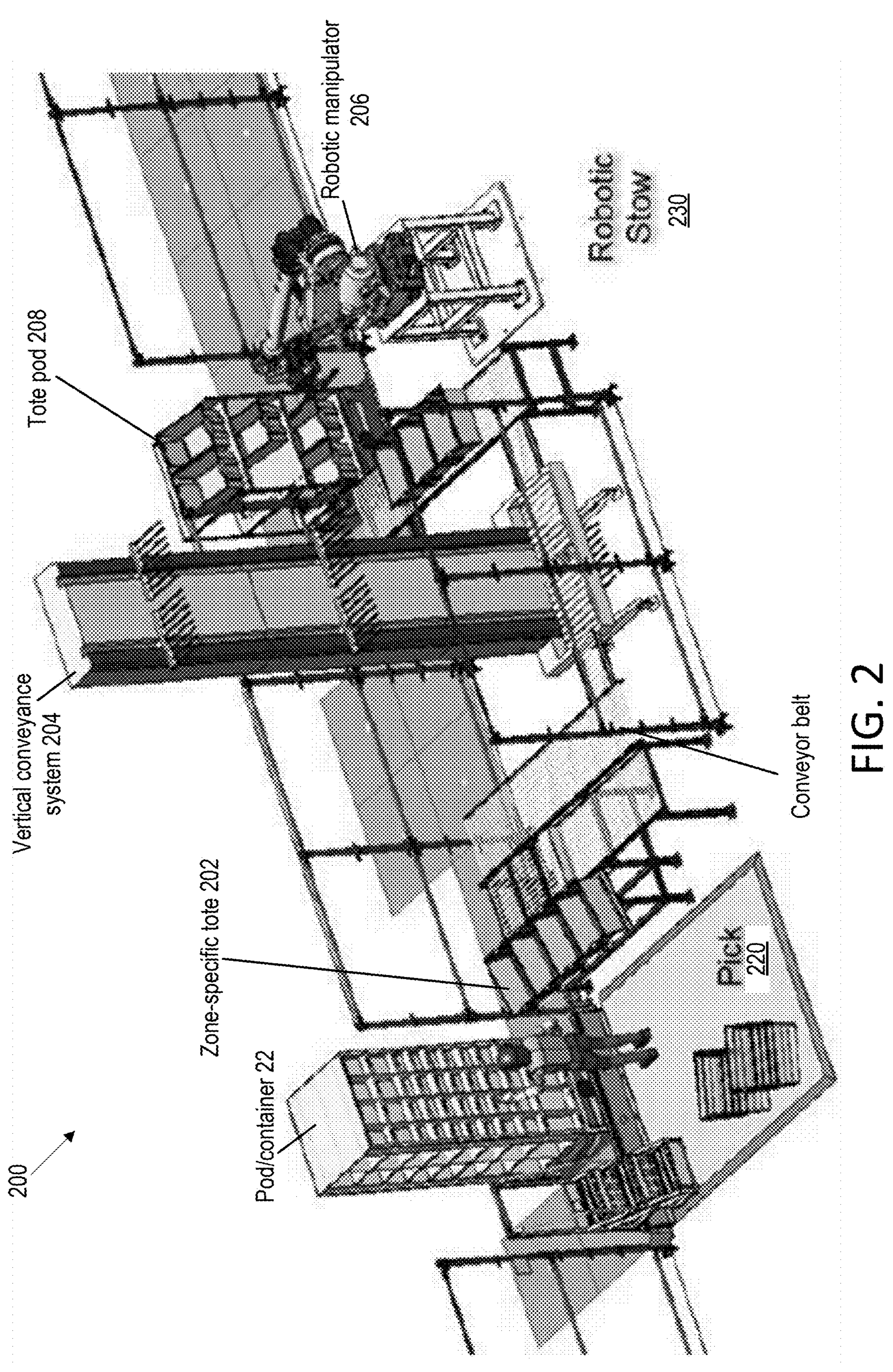
FIG. 2 depicts an example of a zone relocation and re-stowing station, in accordance with various aspects of the present disclosure.

FIG. 2 depicts an example of a zone relocation and re-stowing station 200, in accordance with various aspects of the present disclosure. In the example, pod/container 22 may be brought to the pick station 220 by a laden robotic drive 24 (controlled using computer-executable control instructions wirelessly transmitted to the laden robotic drive 24). In the example shown in FIG. 2, a human selects the appropriate items (according to current order data) for removal from the pod/container 22. In various examples, the appropriate bins of the pod/container 22 in which the target items are stored may be highlighted using colored lights and/or augmented reality in order to guide the picker to the appropriate receptacles in which the items are disposed. In other examples, a robotic manipulator (similar to robotic manipulator 206) may be used to pick the items from pod/container 22.

The picker (whether robotic or human) may place the picked items into zone-specific totes 202. Each of the zone-specific totes 202 may be associated with a particular zone. The zone-specific totes 202 may include fiducial markings (e.g., QR codes or other barcodes, serial numbers, etc.) that may associate the tote with a given zone. This association may be dynamic and may be assigned using a relational database based on current processing needs. For example, zone data (e.g., zone-association data) for a given tote may be associated with that tote's fiducial in a relational database.

When a zone-specific tote 202 if full or is otherwise ready to be sent for downstream processing, the picker may push the zone-specific tote 202 onto the conveyor belt. The fiducial of the zone-specific tote 202 may be scanned (e.g., using a scanner such as a camera and computer vision component, a barcode reader, etc.) to determine the parent zone (e.g., the target zone where the tote should be processed) for the tote by a scanner on the vertical conveyance system 204. The vertical conveyance system 204 may transport totes vertically, to zones on different floors of the processing facility. Since the target zone for each zone-specific tote 202 is known (based on the scanned fiducial), the vertical conveyance system 204 may offload the tote at the appropriate zone. The offloaded zone-specific tote 202 may then be moved (e.g., via a belt-driven conveyor) to the robotic stow station 230 associated with that zone relocation and re-stowing station 200.

In the example implementation depicted in FIG. 2, robotic manipulator 206 may be a robot effective to move the zone-specific totes 202 into an available bay on the tote pod 208 (a "T-pod"). In various examples, the tote pod 208 may include shelves that are angled so that the open face of the totes stowed thereon are tilted toward an outer-face of the tote pod 208. This may allow for easier reaching into the totes for placing and/or removing items (e.g., rendering the totes human-accessible and/or robotic manipulator accessible). The tote pod 208 may be transported by a laden robotic drive 24. In various examples, the laden robotic drives 24 assigned to carry tote pods 208 may be controlled to stay along perimeters of the robotic storage field 30 (e.g., along the corridors 40 along the perimeter) to avoid causing congestion with the pod-moving laden robotic drives 24 which are retrieving/returning pods to the storage blocks 50 in the interior of the robotic storage field 30. However, in some examples, the tote pods 208 may also be sent to an interior of the robotic storage field 30 (e.g., into and/or between the storage blocks 50).

The laden robotic drives 24 carrying the tote pods 208 may take the tote pods 208 to the appropriate rebin stations so that items may be selected from the totes and placed in the appropriate receptacle in the rebin wall for combination with other items in the same order so that the items can be packed together.

It should be noted that, if a zone-specific tote 202 is associated with the same zone as the zone relocation and re-stowing station 200, the zone-specific tote 202 may be passed through and offloaded by the vertical conveyance system 204 without traveling vertically to a different zone. For example, such an "entitled" tote may pass from pick station 220 to robotic stow station 230 without being transported by the vertical conveyance system 204 to another zone. This is because the vertical conveyance system 204 has scanned the tote's fiducial and is aware that this tote is bound for the zone associated with the robotic stow station 230. However, in some alternate examples, instead of passing through the zone relocation and re-stowing station 200, the entitled item that are bound for the same zone as they are currently located in may instead be taken directly to a pick to rebin station at which the item will be processed (e.g., combined with one or more other items in the same package) by the laden robotic drive 24.

Figure 3:
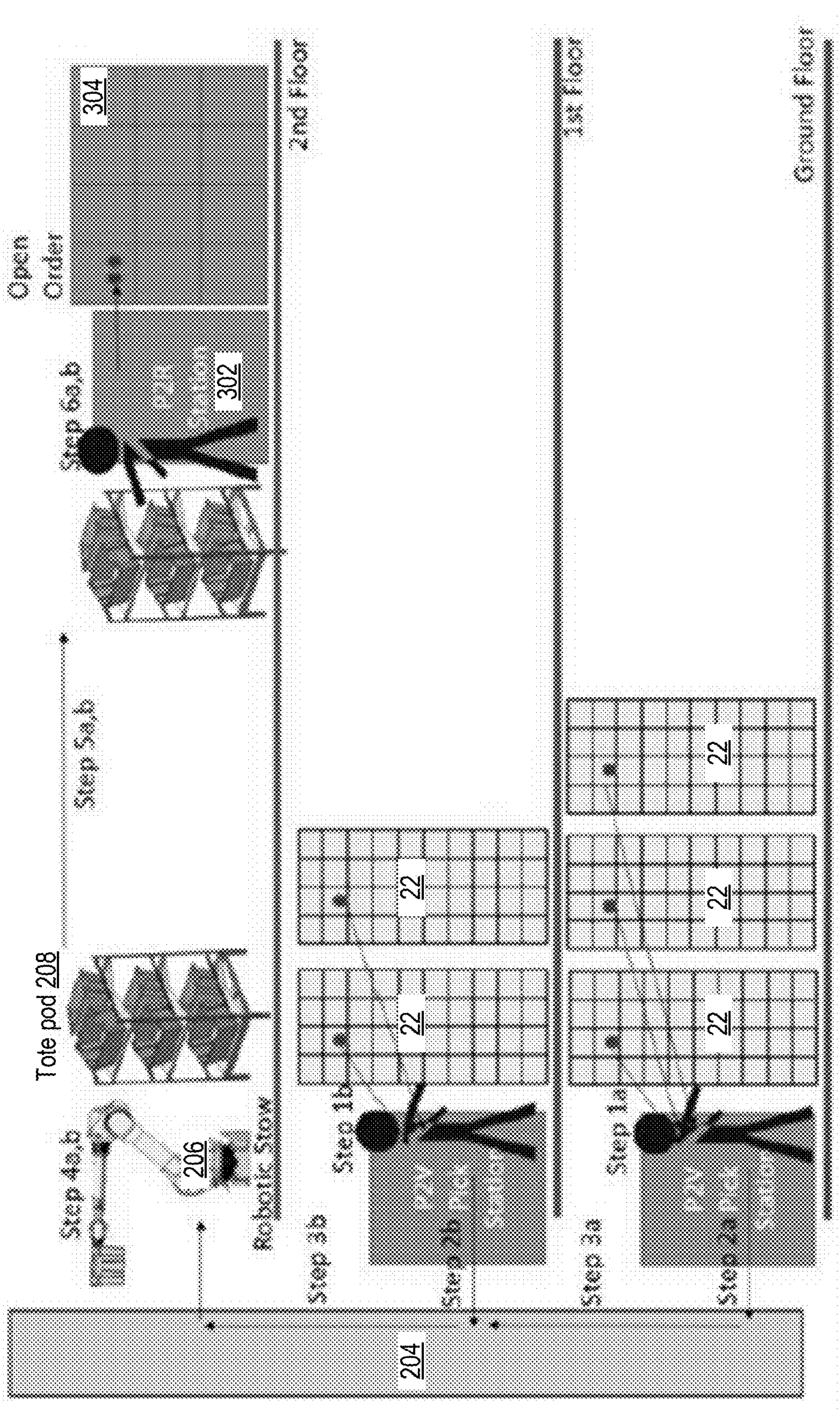
FIG. 3 is diagram illustrating vertical zone relocation, according to various aspects of the present disclosure.

FIG. 3 is diagram illustrating vertical zone relocation, according to various aspects of the present disclosure. In the example of FIG. 3, pods/containers 22 arrive at a pick station (e.g., a pick to vertical (P2V) station such as the pick station 220 of FIG. 2) of a zone relocation and re-stowing station on the ground floor and the first floor (steps 1*a* and 1*b*). The appropriate items are picked from the pods/containers 22 into zone-specific totes 202 and are scanned by the scanner of the vertical conveyance system 204 (steps 2*a* and 2*b*). The zone-specific totes 202 are transported by the vertical conveyance system 204 (steps 3*a* and 3*b*) to the parent floor for the zone-specific totes 202. In the example depicted in FIG. 3, the parent floor is the second floor.

Accordingly, the vertical conveyance system 204 offloads the zone-specific totes 202 at the second floor (representing the target zone). The zone-specific totes 202 arrive at the robotic stow station 230 at the target zone (second floor) and are placed, by robotic manipulator 206 (e.g., a robotic manipulator designed for moving potentially heavy totes), in an available bay on the tote pod 208. The tote pod 208 is transported by a laden robotic drive 24 along the perimeter of the robotic storage field 30 to the appropriate pick-to-rebin station 302 (e.g., P2R—a rebin station). The items for multi-item orders may be selected from the totes on the tote pod 208 and placed in the appropriate receptacles on the rebin wall 304 so that the items in the receptacles may be packed together. It should be noted that the P2V stations may also be P2R stations (and vice versa) and may each have their own rebin walls 304.

The laden robotic drive 24 may return the tote pod 208 to a different robotic stow station 230 to accept another tote in an empty port of the tote pod and/or may take the tote pod 208 to another pick-to-rebin station 302 for more items to be removed and placed in the rebin wall (and/or otherwise processed).

Figure 4:
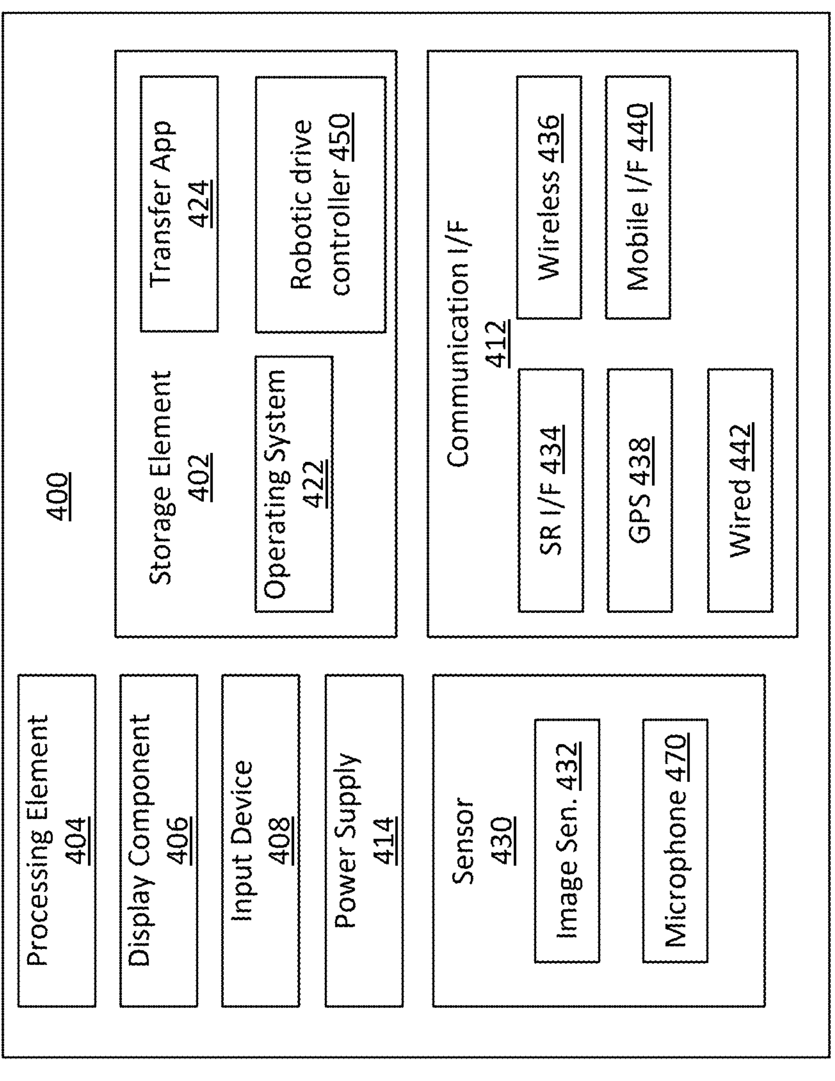
FIG. 4 is an example computing device architecture that may be used in accordance with various techniques described herein.

FIG. 4 is an example computing device architecture 400 that may be used in accordance with various techniques described herein. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). The storage element 402 can include one or more different types of non-transitory computer-readable memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. Additionally, storage element 402 may store computer-executable instructions configured to implement the robotic drive controller 450 described herein.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. The robotic drive controller 450 may include executable instructions to control robotic drives (e.g., laden robotic drives 24 and/or the various robotic manipulators described herein) to perform the various robotic re-stowing of relocated inventory operations described herein. For example, laden robotic drives 24 may be tasked with taking pods/containers 22 from the robotic storage field 30 to the pick stations and/or taking the tote pods 208 from the robotic stow stations 230 to the rebin stations (e.g., pick-to-rebin station 302). As previously described, the robotic drive controller 450 may send control instructions to the laden robotic drives 24 transporting the tote pods 208 to cause such drives to navigate the perimeter of the robotic storage field 30 without entering the interior (to avoid congestion and/or interference with laden robotic drives 24 on dig-out missions (e.g., removing pods/containers 22 from the interior of the robotic storage field 30).

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display input images generated in accordance with the various techniques described herein. In various examples, the display component 406 may be a wearable display (e.g., in a headset, goggles, and/or glasses) that may display the various graphical highlight data, graphical navigational hints, text, other graphical data, etc., described herein. In some examples, the architecture 400 may include one or more speakers effective to output audio.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. In various examples, audio captured by microphone 470 may be streamed to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output. An example of an image sensor 432 may be a camera configured to capture color information, image geometry information, and/or ambient light information. In various examples, the image sensor 432 may be effective to capture image and/or video frames that may be used to detect the various objects in the physical environment of the user.

As noted above, multiple devices may be employed in a single system. In such a multi-device system, each of the devices may include different components for performing different aspects of the system's processing. The multiple devices may include overlapping components. The components of the various computing device(s), as described herein, are exemplary, and may be located as a stand-alone device or may be included, in whole or in part, as a component of a larger device or system.

Figure 5:
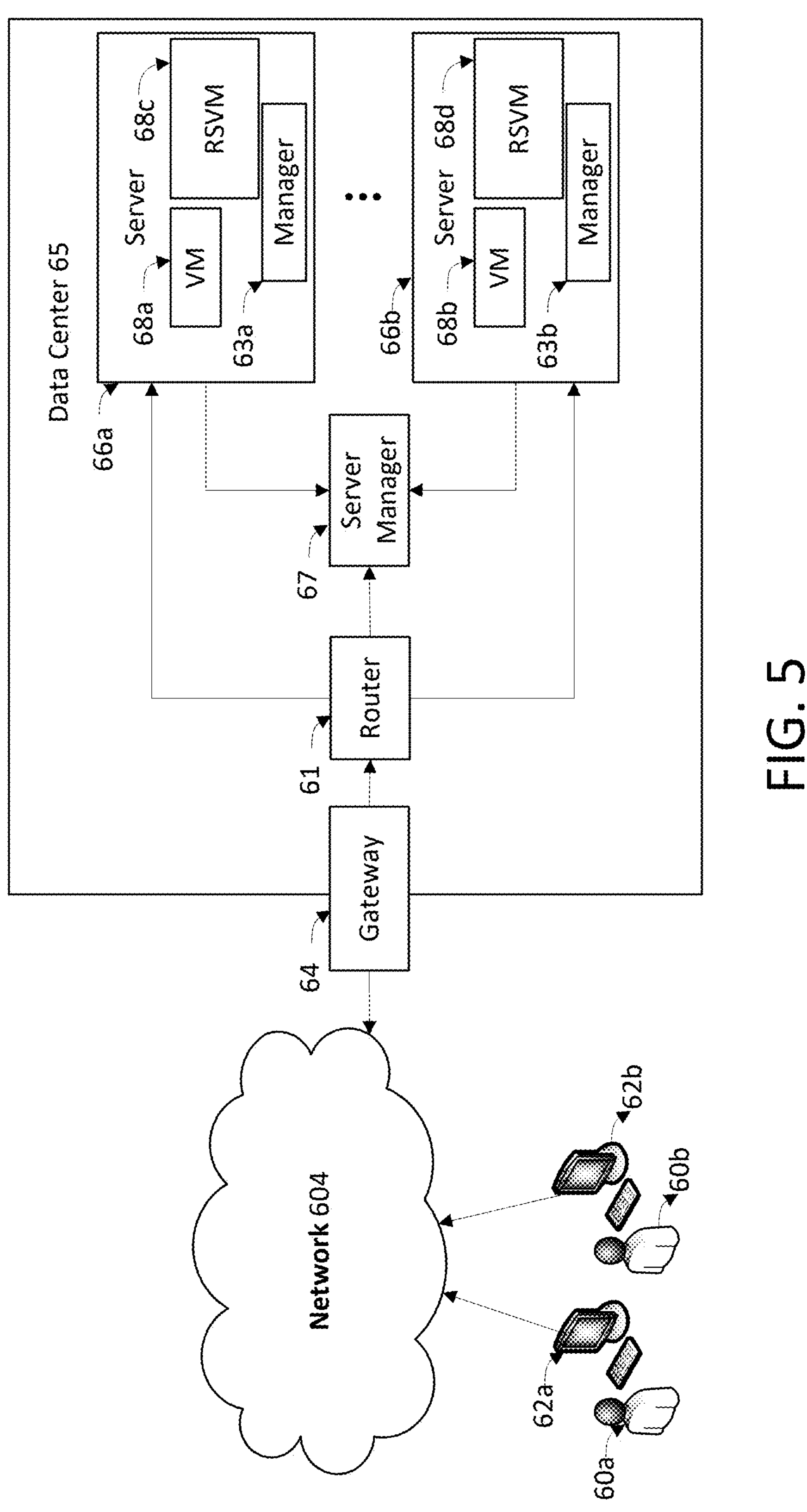
FIG. 5 is a diagram illustrating an example system for sending and providing data that may be used in accordance with the present disclosure.

An example system for sending and providing data that may be used to perform one or more of the various techniques described herein will now be described in detail. In particular, FIG. 5 illustrates an example computing environment in which the embodiments described herein may be implemented. For example, the computing environment of FIG. 5 may be configured to dynamically allocate robotic resources as a service over a network wherein one or more of the techniques described herein may be requested by a first computing device and may be performed by a different computing device configured in communication with the first computing device over a network. FIG. 5 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via a computer communication network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources-consisting of many processors, large amounts of memory and/or large storage capacity- and small resources-consisting of fewer processors, smaller amounts of memory, and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 5 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 5, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box, or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 5 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 5, a router 61 may be utilized to interconnect the servers 66*a* and 66*b*. Router 61 may also be connected to gateway 64, which is connected to network 604. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 5, a data center 65 is also employed to at least in part direct various communications to, from and/or between servers 66*a* and 66*b*. While FIG. 5 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 65 described in FIG. 5 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 6:
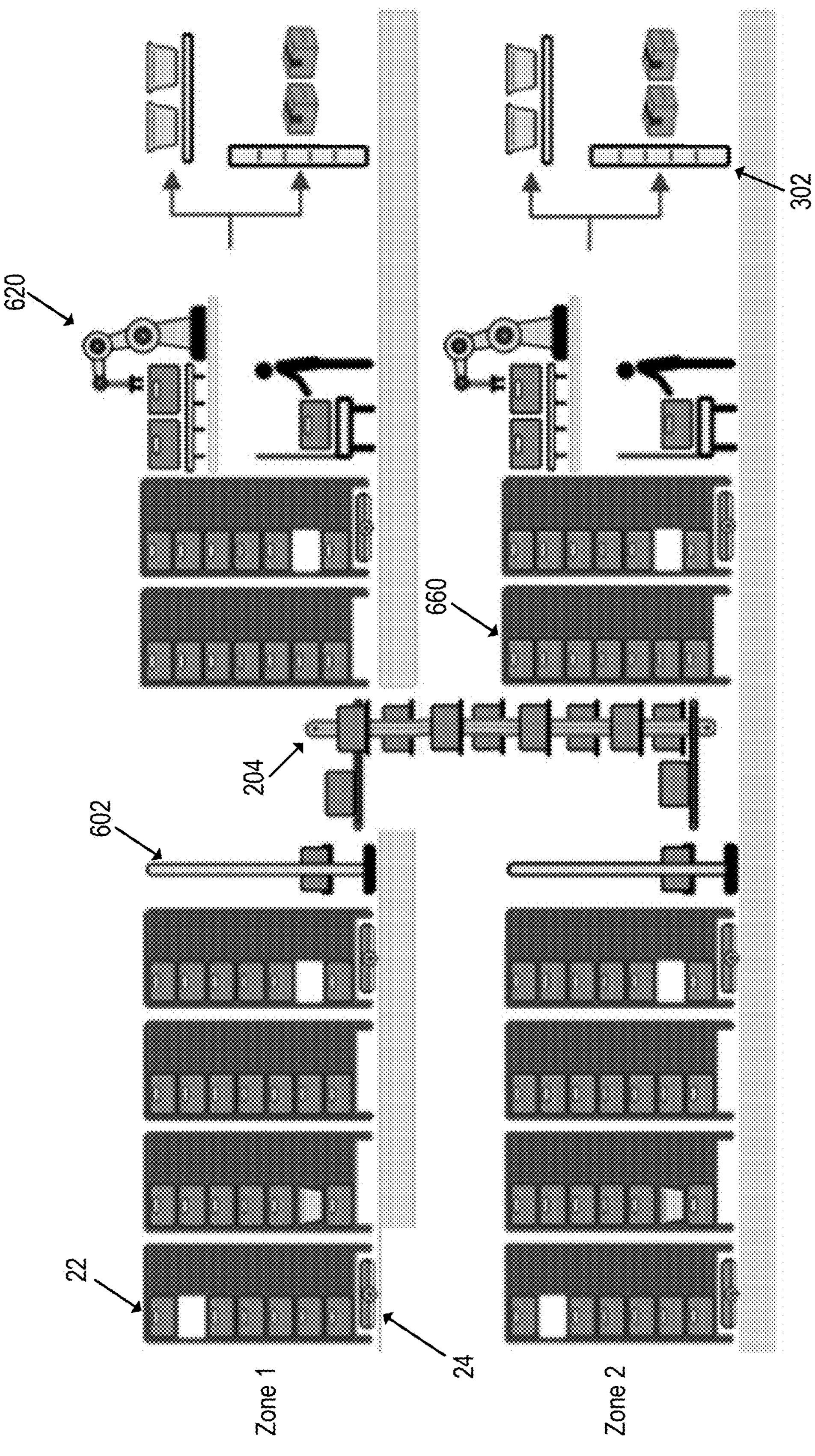
FIG. 6 depicts a tote-based zone relocation system, in accordance with various aspects of the present disclosure.

FIG. 6 depicts a tote-based zone relocation system, in accordance with various aspects of the present disclosure. In the example processing facility of FIG. 6, the pods/containers 22 may be dense tote pods. For example, instead of the pods/containers 22 shown and described in reference to FIGS. 1-2, where individual bins of the pods/containers may include individual items that may be selected from the pods/containers 22, the dense tote pods (pods/containers 22 shown in FIG. 6) may include whole totes. As before, the dense tote pods may be transported throughout a facility using laden robotic drives 24.

A robotic manipulator 602 (e.g., a gantry system) may remove totes from a dense tote pod and place the toes onto the vertical conveyance system 204. As before, totes that are bound for different zones (determined by scanning the tote's fiducial) may be transported by the vertical conveyance system 204 (or by a horizontal conveyance system if the different zones are on the same floor of the facility) to the appropriate zone.

Upon reaching the appropriate zone (the parent zone), the tote may be removed from the vertical conveyance system 204 by another robotic manipulator (e.g., another gantry system) and placed in an available bay on a dense tote pod (e.g., on dense tote pod 660). In some examples, the dense tote pod 660 may include only totes bound for the appropriate zone since this dense tote pod 660 is downstream of the vertical conveyance system 204. A laden robotic drive 24 may be controlled to transport the dense tote pod 660 to the appropriate pick-to-rebin station 302 where items may be removed from the tote and placed in the appropriate receptacle in the rebin wall (e.g., using a robotic manipulator 620 designed for removing items from totes and/or a human picker) for packing. Advantageously, the architecture in FIG. 6 using the dense tote pods may eliminate the pick station 220 (FIG. 2) that is separate from the pick-to-rebin station. Instead, only rebin stations may be needed resulting in increased automation and potentially fewer human interactions.

FIG. 7 is a flow chart illustrating an example process 700 for zone relocation and robotic re-stowing of inventory, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which a determination may be made that a first tote located in a first zone of a processing facility includes a first item bound for a second zone of the processing facility. For example, at action 710, the first item may be picked and placed in a zone-specific tote bound for the parent zone of the first item. It may be determined that the zone-specific tote (e.g., at pick station 220 of the zone relocation and re-stowing station 200) is bound for a different zone of a processing facility. In an alternate implementation using dense tote pods, the first tote including the first item may be located on a dense tote pod.

Processing may continue at action 720, at which a first scanner of a first conveyance system may determine that the first tote is bound for the second zone. For example, a scanner of the first conveyance system (e.g., vertical conveyance system 204) may scan the fiducial on the first tote and may determine the target floor/zone for the first tote. The target floor/zone for the first tote may be assigned using a relational database based on the current order data. In the dense tote pod implementation example, a first robotic manipulator (e.g., a gantry system) may place the first tote on the first conveyance system.

Processing may continue at action 730, at which the first tote may be transported by the first conveyance system to the second zone. The first conveyance system may transport the first tote to the parent zone and may eject the first tote at the first parent zone.

Processing may continue at action 740, at which the first tote may be robotically stowed on a first storage pod in the second zone. For example, the first tote may be transported by a robotic manipulator 206 onto a tote pod 208. In the dense tote pod example, a robotic manipulator (e.g., a gantry system) may place the first tote into an available bay on a dense tote pod.

Processing may continue at action 750, at which a first laden robotic drive unit may transport the first storage pod to a first pick station in the second zone. For example, the tote pod 208 may be transported to a pick-to-rebin station in the parent zone. Thereafter, the first item may be placed in a rebin wall in the appropriate receptacle for packing. In the dense tote pod example, the dense tote pod may be transported by a laden robotic drive 24 to the appropriate pick-to-rebin station.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memorfsey (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:

transporting, by a laden robotic drive unit, a first storage pod comprising a plurality of items to a first pick station, wherein the first pick station is associated with a first zone of a processing facility;

receiving a first item from the first storage pod at the first pick station;

determining that the first item is associated with a second zone of the processing facility located on a different level than the first zone;

placing the first item in a first tote associated with the second zone;

placing the first tote on a vertical conveyor system;

determining that the first tote is associated with the second zone by scanning a fiducial on the first tote using a barcode reader associated with the vertical conveyor system;

transporting, by the vertical conveyor system, the first tote to a first robotic stow station in the second zone;

placing, by a robotic arm of the first robotic stow station, the first tote on a human-accessible storage pod; and transporting, by a second laden robotic drive unit, the human-accessible storage pod to a second pick station in the second zone.

2. The method of claim 1, further comprising:

removing the first tote from the human-accessible storage pod at the second pick station;

determining that the human-accessible storage pod has an empty port;

generating first computer-executable control instructions that, when executed by at least one processor of the second laden robotic drive unit, cause the second laden robotic drive unit to navigate to the first robotic stow station or a second robotic stow station, wherein the first computer-executable control instructions are generated in response to the determining that the human-accessible storage pod has the empty port; and sending the first computer-executable control instructions to the second laden robotic drive unit.

3. The method of claim 1, further comprising:

controlling, using first computer-executable control instructions, the second laden robotic drive unit to navigate a perimeter of a robotic storage field, wherein the first computer-executable control instructions direct the second laden robotic drive unit to move between robotic stow stations and pick stations without entering an interior of the robotic storage field.

4. A method comprising:

determining, using first order data, that a first tote located in a first zone of a processing facility includes a first item bound for a second zone of the processing facility;

determining, based at least in part by scanning the first tote by a first scanner of a first conveyance system, that the first tote is bound for the second zone;

transporting, by the first conveyance system, the first tote from the first zone to the second zone;

robotically stowing the first tote on a first storage pod in the second zone; and transporting, by a first laden robotic drive unit, the first storage pod to a first pick station in the second zone.

5. The method of claim 4, further comprising:

transporting, by a second laden robotic drive unit, a second storage pod comprising the first item to a second pick station in the first zone;

selecting the first item from the second storage pod; and placing the first item in the first tote, wherein the first tote is associated, using zone-association data, with the second zone.

6. The method of claim 4, further comprising:

determining that the first storage pod has an empty port;

generating first computer-executable control instructions that, when executed by at least one processor of the first laden robotic drive unit, cause the first laden robotic drive unit to navigate to a first robotic stow station, wherein the first computer-executable control instructions are generated in response to the determining that the first storage pod has the empty port; and sending the first computer-executable control instructions to the first laden robotic drive unit.

7. The method of claim 4, further comprising:

controlling, using first computer-executable control instructions, the first laden robotic drive unit to navigate a perimeter of a robotic storage field, wherein the first computer-executable control instructions direct the first laden robotic drive unit to move between robotic stow stations and pick stations in the second zone without entering an interior of the robotic storage field.

8. The method of claim 4, further comprising:

assigning the first tote to the second zone based at least in part by associating a fiducial on the first tote in a relational database with zone data identifying the second zone, wherein the first conveyance system scans the fiducial to determine that the first tote is bound for the second zone.

9. The method of claim 4, further comprising:

transporting, by a first gantry system, the first tote from a second storage pod in the first zone to the first conveyance system; and stowing the first tote on the first storage pod in the second zone by a second gantry system, wherein, to stow the first tote on the first storage pod, the second gantry system removes the first tote from the first conveyance system and places the first tote in an available bay on the first storage pod.

10. The method of claim 9, further comprising:

controlling the first gantry system to select the first tote from the second storage pod based on the first tote having the first item bound for the second zone of the processing facility, wherein the transporting, by the first conveyance system, the first tote from the first zone to the second zone comprises vertically transporting the first tote until the first tote has reached the second zone.

11. The method of claim 4, further comprising:

selecting, the first tote from the first conveyance system, by a first robotic arm, wherein the stowing the first tote on the first storage pod comprises:

placing, by the first robotic arm, the first tote on the first storage pod; and determining, by the first laden robotic drive unit, the first pick station in the second zone, wherein the first pick station comprises a multi-item assembly station.

12. The method of claim 11, further comprising:

removing the first item from the first tote; and placing the first item in a first receptacle associated with the first order data.

13. A system comprising:

at least one processor; and non-transitory computer-readable memory storing instructions that, when executed by the at least one processor, are effective to:

determine, using first order data, that a first tote located in a first zone of a processing facility includes a first item bound for a second zone of the processing facility;

determine, based at least in part by scanning the first tote by a first scanner of a first conveyance system, that the first tote is bound for the second zone;

control the first conveyance system to transport the first tote from the first zone to the second zone;

cause the first tote to be stowed on a first storage pod in the second zone; and control a first laden robotic drive unit to transport the first storage pod to a first pick station in the second zone.

14. The system of claim 13, the non-transitory computer-readable memory storing further instructions that, when executed by the at least one processor, are further effective to:

control a second laden robotic drive unit to transport a second storage pod comprising the first item to a second pick station in the first zone;

control a first robot to select the first item from the second storage pod; and control the first robot to place the first item in the first tote, wherein the first tote is associated, using zone-association data, with the second zone.

15. The system of claim 13, the non-transitory computer-readable memory storing further instructions that, when executed by the at least one processor, are further effective to:

determine that the first storage pod has an empty port;

generate first computer-executable control instructions that, when executed by at least one processor of the first laden robotic drive unit, cause the first laden robotic drive unit to navigate to a first robotic stow station, wherein the first computer-executable control instructions are generated in response to the determining that the first storage pod has the empty port; and send the first computer-executable control instructions to the first laden robotic drive unit.

16. The system of claim 13, the non-transitory computer-readable memory storing further instructions that, when executed by the at least one processor, are further effective to:

assign the first tote to the second zone based at least in part by associating a fiducial on the first tote in a relational database with zone data identifying the second zone, wherein the first conveyance system scans the fiducial to determine that the first tote is bound for the second zone.

17. The system of claim 13, the non-transitory computer-readable memory storing further instructions that, when executed by the at least one processor, are further effective to:

control a first gantry system to transport the first tote from a second storage pod in the first zone to the first conveyance system; and control a second gantry system to stow the first tote on the first storage pod in the second zone, wherein, to stow the first tote on the first storage pod, the second gantry system is controlled to remove the first tote from the first conveyance system and places the first tote in an available bay on the first storage pod.

18. The system of claim 17, the non-transitory computer-readable memory storing further instructions that, when executed by the at least one processor, are further effective to:

control the first gantry system to select the first tote from the second storage pod based on the first tote having the first item bound for the second zone of the processing facility, wherein the transporting, by the first conveyance system, the first tote from the first zone to the second zone comprises vertically transporting the first tote until the first tote has reached the second zone.

19. The system of claim 13, the non-transitory computer-readable memory storing further instructions that, when executed by the at least one processor, are further effective to:

control a first robotic arm to select the first tote from the first conveyance system, wherein to stow the first tote on the first storage pod the first robotic arm is controlled to place the first tote on the first storage pod.

20. The system of claim 19, the non-transitory computer-readable memory storing further instructions that, when executed by the at least one processor, are further effective to:

cause the first item to be removed from the first tote; and cause the first item to be placed in a first receptacle associated with the first order data.

* * * * *